United States Patent Office 3,500,060
Patented Mar. 10, 1970

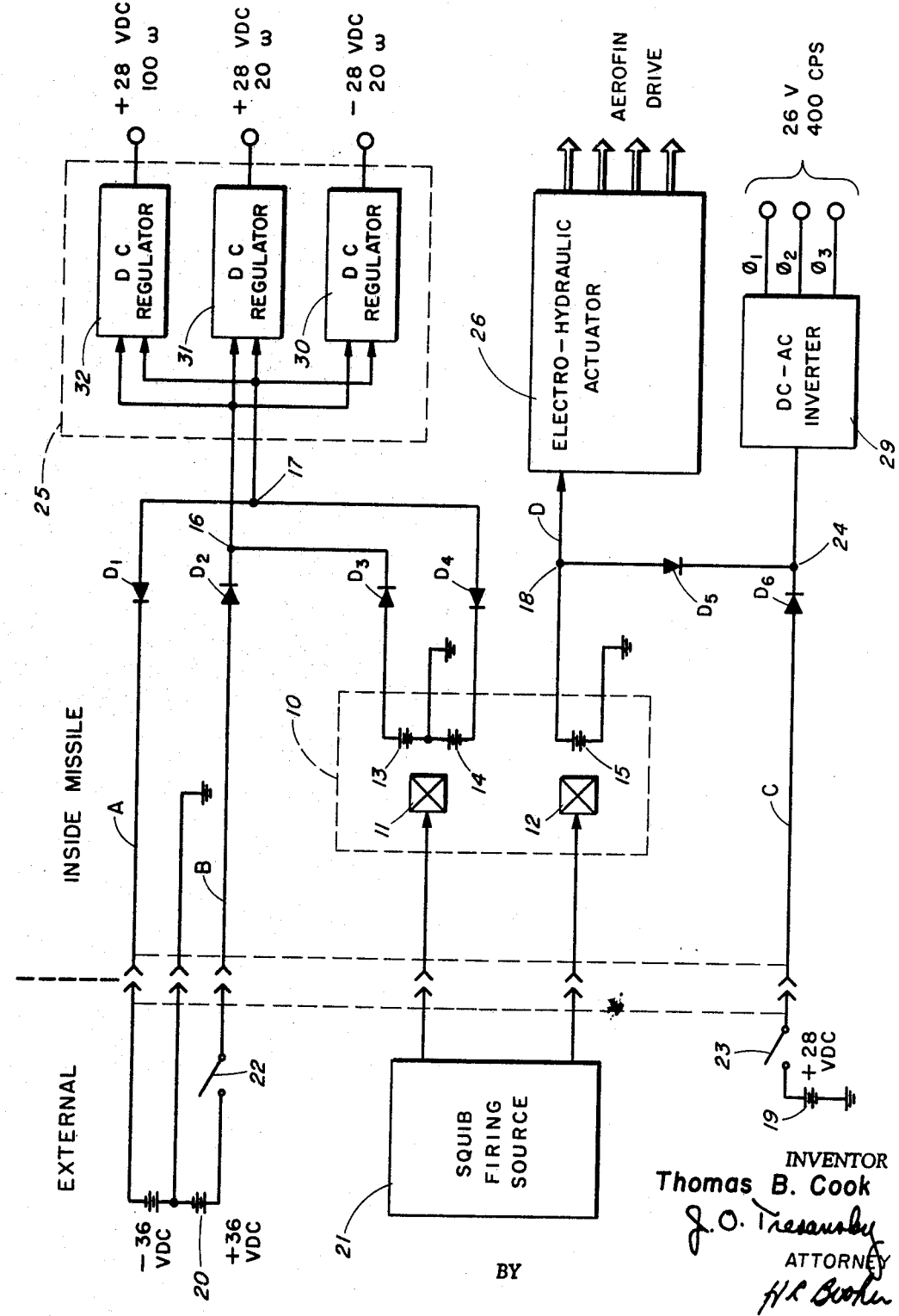

3,500,060
POWER SUPPLY SYSTEM
Thomas B. Cook, Wheaton, Md., assignor to the United States of America as represented by the Secretary of the Navy
Filed Oct. 23, 1967, Ser. No. 678,483
Int. Cl. H02m 7/00
U.S. Cl. 307—151                            6 Claims

ABSTRACT OF THE DISCLOSURE

A primary inflight electrical and mechanical power supply providing electro-mechanical power as well as D.C. and A.C. power to a guided missile having a power transfer network which eliminates undesirable transients and synchronization losses in power transfer from an external source to an internal source. A power converter network providing regulated D.C. power, electro-mechanical power, and 3 phase A.C. power from a D.C. source.

BACKGROUND OF THE INVENTION

This invention generally relates to power supply systems and more particularly to a power supply system simultaneously providing A.C. power, D.C. power and mechanical power.

The invention is intended to function as an accessory power supply for a submarine launched guided missile. Generally, missiles of this type are used as antisubmarine weapons. These weapons are provided with nuclear warheads and are designed to be launched from a topedo tube of an attack submarine, thereafter to emerge from the water and go through an air boost phase depending upon the selected range, during which it is directed to the target area by the guidance system and then to re-enter the water at the target.

In the past, accessory power units have been used in missiles such as those described above to provide primary inflight electrical power, secondary prelaunch electrical power and primary inflight mechanical power to drive the missiles aerofins. These units have usually employed a propellant burning gas turbine generator driving a rotary inverter and a hydraulic pump. Although the units in some instances, have provided both mechanical and electrical power to the missile in flight satisfactorily, some difficulties and limitations have resulted from the use of these power systems. For example, the launching depth and the time of flight of the missile is limited when a gas propellant is used. The need to exhaust generator gases limits the launching depth because of the high pressure existing on the missile at very great depths in the water and to obtain the desired ranges, the size of the cartridge has been found to be too large to be satisfactory. Other problems, such as control of gas stream, the danger associated with handling live propellant grain and the storage of the gas generator cartridge, exist with prior supply systems. In addition to these problems, undesirable transients and loss in A.C. synchronization tend to be introduced into the system during the process of transferring from submarine power to internal missile power. With these and other drawbacks of the prior art accessory power supply systems, a need has arisen for a new and improved power supply unit for use in guided missiles. There also is a general need for a power converter system which simultaneously converts D.C. power to regulated D.C. power, electro-mechanical power, and 3 phase A.C. power.

SUMMARY OF THE INVENTION

The general purpose and object of the invention is to provide a primary inflight electrical and mechanical power supply system providing D.C. power, A.C. power, and mechanical power for a guided missile, which is relatively simple in design, reduced in size and weight from prior art device, eliminates undesirable transients and synchronization losses in power transfer from an external source to an inflight source, and overcomes the other limitations and disadvantages of prior art devices.

The above and other objects and purposes are attained by a novel power converter network having a primary battery and diode arrangement which powers a D.C. regulator, a D.C. to A.C. inverter, and an electro-mechanical power converter.

BRIEF DESCRIPTION OF THE DRAWINGS

The foregoing and other objects, features and attendant advantages will be readily appreciated as the same becomes better understood by the accompanying drawing wherein:

The sole figure is a schematic illustration of one embodiment of the invention.

DETAILED DESCRIPTION OF THE PREFERRED EMBODIMENT

As shown in the figure the missile contained power supply unit includes a silver-zinc battery 10 which is initiated by a squib firing source 21 at a predetermined time to supply primary D.C. power to a D.C. regulator network 25, an electro-hydraulic actuator 26, and a D.C. to A.C. inverter 29. The actuator 26 drives the fins of a missile while the regulator network 25 and the inverter 29 supply electrical power to the adaption kit and guidance portion of the missile. The particular missile adaption kit and guidance system which utilizes the specific voltage outputs illustrated is more fully disclosed in the application of Albert Will et al. Ser. No. 545,792 filed Apr. 21, 1966.

The primary battery unit 10 is conventional and may be similar to the unit supplied by the Power Sources Div., of Whittaker Corp., Model No. P–158B. The squib firing source 21 may be any suitable source such as the submarine power supply which is coupled to the squibs in battery unit 10 when the unit 10 is to be energized.

Batteries 19 and 20 are submarine D.C. power supplier of 28 and 36 volts, respectively, and may be coupled to lines A, B and C or removed from the lines by switches 22 and 23. In the prelaunch condition, switches 22 and 23 are closed. Negative 36 volts D.C. is supplied over line A through a diode $D_1$ to the regulator network 25 and positive 36 volts over line B through a diode $D_2$ to the regulator network 25. Positive 28 volts D.C. is applied over line C through a diode $D_6$ to the inverter 29.

Immediately prior to launch, the squib firing source 21 is initiated causing squibs 11 and 12 to fire. The squibs upon firing force an electrolyte (not shown) into the cells of batteries 13, 14 and 15. Batteries 13 and 14 are 36 volt silver-zinc batteries and battery 15 is a 28 volt silver-zinc battery. After the batteries have had an opportunity to be fully energized, switches 22 and 23 are opened by the missile fire control system (not shown) thereby removing the external submarine power from the missile immediately prior to launch.

Battery 13 is connected at junction 16 to line B through diode $D_3$ thus providing positive D.C. voltage to each of the regulators 30, 31 and 32. Negative voltage battery 14 is connected through diode $D_4$ at point 17 to line A thus supplying negative voltage to each of the regulators.

The regulators in regulator network 25 may be, for example, similar to the switching regulators manufactured by Technipower, Inc., a subsidiary of Benrus, Part Numbers PCTP 40.0–6.0V and PCTN 40.0–0.750V. Together the D.C. switching regulators supply both positive and negative 28 volt D.C. power to the missile electrical system.

Battery 15 supplies 28 volts D.C. directly over line D to the actuator unit 26. The electrohydraulic actuator unit 26 is comprised of a motor, pump, accumulator, manifold, four servovalves, four feedback potentiometers, and curvic spline couplings used for driving the aerofins. On command from the guidance system the unit will deliver 850 inch-lbs. of torque to the aerofins at a 200°/second rate. The details of this unit are described in the Kearfott Products Division manual "Operating and Maintenance Instructions, Electro-Hydraulic Actuation System," Model No. C706025001.

The D.C.–A.C. inverter 29 is connected to 28 volt D.C. source 15 by a diode $D_5$ connected between junctions 18 and 19. The inverter 29 is a solid state, 3 phase, 26 volts line to line, 400 c.p.s. inverter which may be similar to the unit manufactured by Abbott Transistor Laboratories, Inc., Model Q10C–27A–400D. It is used to supply all gyro, platform, and synchro 400 c.p.s. power requirements in the missile.

The accessory power unit illustrated in the figure will operate in a submarine launched missile having a fire control system in the following manner. When the missile is placed in the prespin condition, the external 36 volt and 28 volt power supplies furnish the regulators 30, 31, 32 and the inverters 25 with prelaunch D.C. power. This is then converted to supply the various missile loads and the inverter is synchronized to the reference 400 c.p.s. of the fire control (not shown). When the missile is committed to fire, the main battery and the electronics battery squibs 12 and 11 are initiated by the 26 v. D.C. submarine power and the battery subsystem 10 begins to supply the regulator, inverter, and actuator subsystems with internal power. Current detectors (not shown) in the fire control system remove the external power from the line and when all initial conditions of the missile are matched, the missile is launched; the accessory power unit (APU) continues to supply the inflight power. At rocket motor cutoff, the actuators are fed control signals from the guidance system (not shown); these commands to the aerofins continue through parachute deployment at which time the APU has completed its function.

The blocking diodes $D_1$ to $D_6$ enable the transfer of power from external ship's power to internal missile power without power transfer transients. In this way also, the 400 c.p.s. synchro reference is not interrupted by power transfer prior to launch.

The power unit can be contained in a hollow cylinder with a length less than 15 inches and a diameter of approximately 13.5 inches. The weight is less than 67 pounds and the volume is less than 1800 cu. inches. The prior art system is heavier and almost twice the size primarily because of the bulky gas turbine generator, propellant cartridge, and rotary inverter. The battery unit 10 supplies flight power at least twice as long as a propellant cartridge and does not need to expel gases under water.

The accessory power unit of the instant invention therefore has a substantial overall reduction in size and weight over prior art devices, has extended flight time, and does not have a launching depth limitation. It transfers power to the internal missile smoothly without interruption, simplifies testing procedures, and removes many of the manufacturing, storage and safety problems involved.

It should be apparent from the foregoing description of one embodiment of the invention that a new and improved power supply system has been developed. The invention should not, however, be limited in scope to the specific embodiment described. Many modifications, changes and other embodiments are contemplated. For example, several switching regulators can furnish a negative voltage from a positive source, enabling reduction of the battery size from two stacks of 36 volts each to a single stack of 36 volts, negative ground. This would also permit simplification of the service test equipment. It would also be possible to run the inverter from this single stack arrangement if main battery voltage regulations became a problem. Then the arrangement shown in FIG. 1 may be modified in operation to fire the electronics battery first and then initiate the main battery just several seconds prior to launch. For advance designs of several guidance systems ±15 volt D.C. regulators may be employed, reducing the size of filter capacitors required in the regulators.

The power converter network also may have uses other than converting power for missile purposes in any application where it is desirable to simultaneously provide D.C. regulated power, 3-phase A.C. power and electro-mechanical power from a single D.C. source.

Reference should be made to the appended claims, therefore, rather than the specification as indicating the scope of the invention.

What is claimed as new and desired to be secured by Letters Patent of the United States is:

1. A power supply system for a guided missile during both its prelaunch stage and flight stage comprising:
 first and second external electrical power supply means,
 first and second internal explosive squib-actuated batteries each having an electrolyte forced into the battery upon the firing of the squib at a predetermined time prior to flight thereby energizing said batteries at said predetermined time,
 a D.C. switching regulator network,
 a D.C. to A.C. inverter,
 means selectively connecting said first supply means to said regulator network prior to said predetermined time and said first battery to said regulator network after said predetermined time, and
 means selectively connecting said second power supply means to said inverter prior to said predetermined time and said second battery to said inverter after said predetermined time.

2. The system of claim 1 wherein said first recited selectively connecting means includes a first pair of diodes connecting the first power supply means to said regulator network prior to the predetermined time and a second pair of diodes connected between said first battery and said regulator network,
 said second recited selectively connecting means including a diode connecting said second power supply means to said inverter prior to the predetermined time and a diode connected between the second battery and the inverter.

3. The system of claim 2 further comprising an external squib firing source connected to said battery squibs, and
 means for breaking the connections of said first and second external power supply means after the firing of said squibs.

4. The system of claim 2 further comprising an electro-hydraulic actuator directly connected between said second battery and said actuator.

5. An electrical and mechanical power supply system comprising
 a D.C. switching regulator,
 a D.C. to A.C. inverter,
 means for converting electrical power to mechanical power,
 first and second explosive squib actuated batteries each having electrolyte forced into the battery at a predetermined time for energizing said batteries at the predetermined time, first diode means connected between said first battery and said D.C. regulator and second diode means connected between said second battery and said inverter; and said second battery being directly connected to said power converter wherein said system supplies D.C. regulated power, A.C. power and mechanical power at said predetermined time.

6. The system of claim 5 wherein said batteries are silver-zinc batteries.

References Cited

UNITED STATES PATENTS 3,024,373  3/1962  Seike _____ 307—150

RICHARD A. FARLEY, Primary Examiner

CHARLES E. WANDS, Assistant Examiner